United States Patent [19]

Schranz

[11] Patent Number: 5,126,888
[45] Date of Patent: Jun. 30, 1992

[54] SYSTEM FOR RECORDING AND DETECTING MARKING SIGNALS

[75] Inventor: Hans Schranz, Vienna, Austria
[73] Assignee: U.S. Philips Corporation, New York, N.Y.
[21] Appl. No.: 395,127
[22] Filed: Aug. 17, 1989
[30] Foreign Application Priority Data
    Oct. 13, 1988 [AT] Austria .............................. A2543/88
[51] Int. Cl.⁵ ............................................. G11B 5/02
[52] U.S. Cl. .................................... 360/27; 360/72.1
[58] Field of Search .................. 360/27, 40, 72.1, 72.3
[56] References Cited
    U.S. PATENT DOCUMENTS
    4,378,577  3/1983  Chamberlin ......................... 360/72.2
    4,677,501  6/1987  Saltzman et al. ..................... 360/27
    4,794,474 12/1988  Dwyer et al. ....................... 360/72.2

Primary Examiner—David J. Severin
Attorney, Agent, or Firm—Leroy Eason

[57] ABSTRACT

A system for recording a plurality of marking signals on a record carrier track during scanning thereof, and for detecting from the track during scanning thereof the marking signals recorded thereon. The system includes recording apparatus which generates the marking signals (M1, M2, M3) as different combinations of first and second recording signals (S1, S2) of different frequencies and of durations which are selected by respective time-control stages (Z1, Z2). The first marking signal (M1) may consist of only the first recording signal (S1) having a predetermined duration T; the second marking signal (M2) may consist of the combination of the first marking signal (S1) of duration T and the second marking (S2) of the same duration T; and the third marking signal (M3) may consist of the combination of the first recording signal (S1) of duration (P) and the second marking signals (S2) of a duration between T and zero such as T/2. The system also includes reproducing apparatus for detecting during scanning of the track detection signals (S1', S2') corresponding to the recording signals (S1, S2) recorded thereon, the reproducing apparatus including time-measurement stages (Z3, Z4) for determining the duration at least the detection signal (S2') corresponding to the recording signal (S2) which may have various different durations, and a logic circuit which combines the detection signals in accordance with the determined durations so as to derive the marking signal represented thereby.

7 Claims, 4 Drawing Sheets

SYSTEM FOR RECORDING AND DETECTING MARKING SIGNALS

BACKGROUND OF THE INVENTION

1. Field of the Invention

The invention relates to a system for recording and detecting marking signals which can be stored on and scanned from a record carrier and which can be distinguished from one another, comprising a recording device for recording the marking signals to be stored and a detection device for detecting the marking signals being scanned. The recording device includes means for generating the marking signals to be stored and the detection device includes means for detecting the marking signals being scanned, the marking signal generator having a first stage for generating a first signal at a first frequency, a second stage for generating a second signal at a second frequency, a first time-control stage by means of which the duration of the first signal can be defined, and a second time-control stage by means of which the duration of the second signal can be defined. The first time-control stage defines a predetermined value T for the duration of the first signal and the second time-control stage at the same time defines the value zero for the duration of the second signal when a marking signal of a first type is to be generated consisting only of the first signal. The first time-control stage defines the value T for the duration of the first signal and the second time-control stage at the same time defines the value T for the duration of the second signal when a marking signal of a second type is to be generated consisting of the first signal and the second signal. The detector means includes a first detector stage for detecting a signal which is scanned from the record carrier and which corresponds to the first signal, a second detector stage for detecting a signal which is scanned from the record carrier and which corresponds to the second signal, which stages each supply an output signal when the corresponding scanning signal occurs, and a logic stage which, depending on the output signals of the two detector stages, generates and supplies detection signals corresponding to the marking signals scanned from the record carrier.

2. Description of the Related Art

Such a system is employed in a dictation system manufactured and marketed by N.V. Philips and referred to as the "mini-cassette dictation system", the system comprising pocket dictation machines and portable dictation machines, which enable dictations to be recorded as well as reproduced, and transcription machines, which are only suitable for the reproduction of dictations. In this known dictation system, the system employed therein for recording and detecting marking signals, which is of the type defined in the opening paragraph, enables marking signals of two different types to be recorded on a magnetic tape record carrier to mark specific dictated passages by recording the marking signals and to locate these passages by detection of the marking signals scanned. In this system a marking signal of a first type, which is constituted by a first sinewave signal having a frequency of 40 Hz and a duration, for example, of 650 ms, and which is recorded on the magnetic tape at a given normal speed of transport of said tape, then enables the end of a dictation to be marked. By means of a marking signal of the second type, constituted by the first sinewave signal having a frequency of 40 Hz and a second sinewave signal having a frequency of 1500 Hz, which signals are generated simultaneously for the same length of time of 650 ms and are recorded on the magnetic tape at the same normal speed of transport of this tape, it is possible to mark dictated passages for which the dictator has given or wishes to give special instructions, indications for correction or the like, to be observed during transcription of the dictation. As is evident from the foregoing, the marking signals of the first and the second type in the known system differ from each other in that a marking signal of the first type comprises only one signal having a given frequency and a given duration, and a marking signal of the second type comprises two signals, one signal having the same frequency as the first marking signal and the other signal having a different frequency, which signals each have the same duration as the first marking signal.

In the known system the marking signals of the first and the second type scanned from the tape are detected at a speed of transport of the magnetic tape which is higher than the speed at which the marking signals are recorded, this speed of transport being, for example, a factor of 20 higher than the speed of transport during recording of the marking signals. This higher speed of transport during detection of the marking signals being scanned results in the signals forming the marking signals being subjected to a frequency conversion by a factor of 20, so that during detection of a marking signal of the first type a signal having a frequency of 800 Hz is obtained, which corresponds to the first sinewave signal of a frequency of 40 Hz, and during detection of the marking signal of the second type a signal having a frequency of 800 Hz, corresponding to the first sinewave signal having a frequency of 40 Hz, and a signal having a frequency of 30 kHz, corresponding to the second sinewave signal having a frequency of 1500 Hz, is scanned from the magnetic tape. For this reason the detection device for the marking signals of the first and the second type scanned from the magnetic tape in the known system comprises detector means comprising a first detector stage for detecting a signal of a frequency of 800 Hz and a second detector stage for detecting a signal of a frequency of 30 kHz, both stages each supplying an output signal when the corresponding signal occurs, which output signal is applied to a logic stage following the two detector stages. If only the first detector stage supplies such an output signal the logic stage will produce a detection signal corresponding to a marking signal of the first type. If both detector stages supply an output signal the logic stage will supply a detection signal corresponding to a marking signal of the second type. These detection signals can be applied to an optical or acoustic signalling device. However, they may also be applied to a stop device for stopping the drive system for the magnetic tape, so that upon detection of a marking signal the magnetic tape transport is discontinued in that the drive system for the magnetic tape is switched off.

In the prior-art system for recording and detecting marking signals, as described in the foregoing, it is possible only to record and detect two different marking signals of a first and a second type. This is found to be a drawback limiting the use of the apparatuses of the known dictation system because there is a need for further marking possibilities by means of marking signals, which cannot be realised in the known system for recording and detecting only two marking signals.

SUMMARY OF THE INVENTION

Therefore it is an object of the invention to meet this requirement and to provide a system of the type defined in the opening paragraph in such a way that by means of the system in accordance with the invention at least a third type of marking signal can be generated and detected. Although it is not possible for a detection device of the prior-art system to detect the nature of such a marking signal of the third type, a further object is to enable its presence to be detected by such a detection device in order to guarantee compatibility between the prior-art system and the system in accordance with the invention with respect to the detection of the presence of marking signals.

In accordance with the invention this object is achieved in that for generating a marking signal of a third type, made up of the first signal and the second signal, at least one of the two time-control stages sets the duration of one such signal to a value which differs from the values zero and T. In addition, besides the two detector stages for detecting the two signals which are scanned from the record carrier and which correspond to the first signal and the second signal, the detector means also comprises a time-measurement stage for measuring the duration of the one of the two signals having a duration which differs from the value zero and T. The time-measurement stage, depending on the measured length, applies different measurement values to the logic stage in order to generate detection signals corresponding to the marking signals scanned from the record carrier. In this way it is achieved that at least a new marking signal of a third type becomes available, which signal comprises two signals of different frequencies in the same way as the known marking signal of the second type. In order to distinguish a marking signal of the third type from a known marking signal of the second type, the duration of at least one signal in a marking signal of the third type is selected to differ from the duration of this signal in a marking signal of the second type, so that by detection of these different durations a marking signal of the third type can be distinguished unambiguously from a marking signal of the second type. Since such a new marking signal of the third type is made up of the same two signals as a known marking signal of the second type, a marking signal of the third type can also be detected by means of the known type of detection device adapted for the detection of a marking signal of the second type. Although the nature of such new marking signal of the third type cannot be distinguished by such a detection device from that of a known marking signal of the second type, it nevertheless can detect the presence of such marking signals of the third type. Thus, the known system and the system in accordance with the invention are compatible with respect to the detection of the presence of marking signals.

In this respect it is to be noted, that, for example, from DE-OS 20 29 090, it is known per se to utilise marking signals having different durations. However, in accordance with DE-OS 20 29 090, all these known marking signals are constituted by a single signal having a predetermined frequency, whereas in accordance with the invention the marking signals are made up of two signals of different frequencies and having different durations, which has the advantage that these marking signals can be detected in a simple manner independently of the driving speed or the speed of transport of the record carrier during detection.

In order to generate at least a marking signal of the third type both the first time-control stage and the second time-control stage can each define at least one value, which differs from the values zero and T, for the duration of the relevant signal. However, it is found to be advantageous, if the first time-control stage defines the value T for the duration of the first signal and the second time-control stage defines a value which differs from the values zero and T for the duration of the second signal. This simplifies the generation and detection of all the marking signals because the duration of the first signal of the first frequency will be the same for the marking signals of all three different types. Therefore, in order to detect all the marking signals of the three different types, it is only required to detect the mere presence of the signal corresponding to the first signal by means of the detector stage, without the necessity of determining the duration of the signal corresponding to the first signal.

It is also found to be advantageous if, for generating a marking signal of the third type, the first time-control stage defines the value T for the duration of the first signal and, in addition, the second time-control stage defines the value T/2 for the duration of the second signal. Such a marking signal of the third type can be distinguished very reliably and easily from the known marking signals of the first and the second type, which is an advantage for a correct detection of the marking signals.

It is further found to be advantageous if, for generating at least a marking signal of the third type, the two time-control stages define the same starting instant for both signals. This greatly simplifies time-control of the time-control stages.

The time-control stages may be constructed, for example, as gate circuits allowing the first and second signals, which are generated continuously by the generator stages, to pass for the relevant length of time. However, it is found to be advantageous if the two time-control stages activate the two generator stages to generate the first and the second signals. For less power consumption than if the generator stages are constructed of discrete components, and for a simpler program sequence requiring a minimal storage capacity, the generator stages may be provided in the form of a microprocessor.

In a system in accordance with the invention, comprising a first actuating element for starting the generation and recording of a marking signal of the first type and a second actuating element for starting the generation and recording of a marking signal of the second type, which actuating elements are known per se from the mini-cassette dictation system mentioned in the foregoing, it is also found to be advantageous if the generation and recording of at least a marking signal of the third type can be started by actuating one of the two actuating elements at least twice in succession within a predetermined time interval. Thus it is not necessary to provide at least a further actuating element for starting the generation and recording of a marking signal of the third type, which is an advantage in order to realize an apparatus of simple construction comprising a minimal number of actuating elements.

In a system in accordance with the invention it is also found to be advantageous if the detector means comprises a first time-measurement stage for measuring the duration of the signal which is scanned from the record carrier and which corresponds to the first signal and a second time-measurement stage for measuring the duration of the signal which is scanned from the record carrier and which corresponds to the second signal, which stages both supply their measurement values to the logic stage. Depending on the ratio between the measured values, the logic stage generates detection signals corresponding to the marking signals being scanned. Thus it is achieved that the detection of the marking signals being scanned is independent of the speed of transport of the record carrier during scanning of the marking signals.

BRIEF DESCRIPTION OF THE DRAWINGS

Embodiments of the invention will now be described in more detail, by way of non-limitative example, with reference to the accompanying drawings wherein.

DESCRIPTION OF THE PREFERRED EMBODIMENTS

Figure 1:
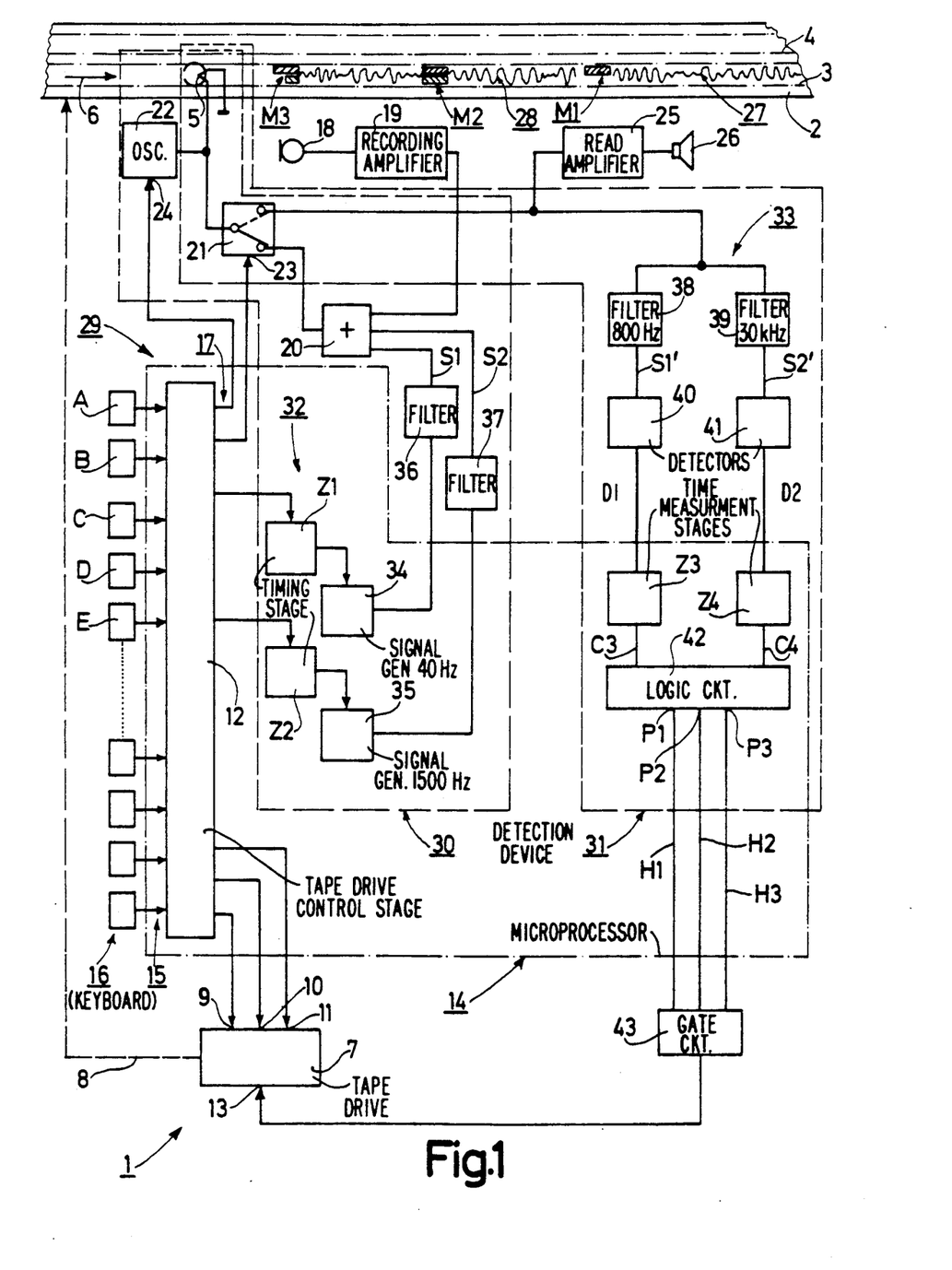
FIG. 1 shows diagrammatically a dictation machine for recording and reproducing speech signals on/from a record carrier in the form of a tape, which machine comprises a system for recording and detecting marking signals, which system enables marking signals of three different types to be recorded and detected.

FIG. 1 shows diagrammatically those parts of a portable dictation machine 1 which are relevant to the invention, by means of which dictation machine speech signals can be recorded on a magnetic tape 2 contained in a cassette, not shown, and can be scanned from said tape in order to be reproduced. FIG. 1 shows a part of the magnetic tape 2. The magnetic tape 2 has two tracks 3 and 4, indicated in broken lines, which can be scanned in opposite directions of transport of the magnetic tape to record and reproduce signals by means of a magnetic recording/reproducing head 5.

For scanning the track 3 the magnetic tape 2 is driven in a direction indicated by an arrow 6. This transport of the magnetic tape 2 is realised by means of a motor-driven tape-drive device 7 shown diagramatically, which drives the magnetic tape 2 via winding mandrils which are coupled to reel hubs in a cassette, as is indicated symbolically by means of the broken lines in FIG. 1. The tape-drive device 7 comprises three control inputs 9, 10 and 11, which can be controlled by a control stage 12 to switch the tape drive device 7 to three different modes, in which tape transport is effected at the normal speed in the direction indicated by the arrow 6, at twenty times said speed in the direction indicated by the arrow 6 and at twenty times said speed in a direction opposite to that indicated by the arrow 6. The tape drive device 7 further comprises a control input 13, via which this device can be switched off to terminate the transport of the magnetic tape 2.

In the present apparatus the control stage 12 forms part of a microprocessor 14, which is represented diagrammatically by a dash-dot line in FIG. 1. By means of the control stage 12 it is possible to determine via the interrogation inputs 15 whether a key and which key of a keyboard 16 for selecting the modes and functions of the apparatus has been actuated. In addition, the control stage 12 supplies control signals via control outputs 17 for controlling apparatus sections, such as the tape-drive device 7.

A microphone 18, which can be plugged into the apparatus 1, is connected to this apparatus. The output signals of the microphone 18 are applied to a recording amplifier circuit 19, whose output signals are fed to a summing stage 20. The output signals of the summing stage 20 are applied to a recording/reproduction switch 21, which transfers the signals applied to it to the magnetic head 5 in the switch position shown in solid lines in FIG. 1, which position it occupies in order to record signals. In this way speech signals corresponding to a dictated text can be recorded on the magnetic tape 2. When signals are recorded an oscillator 22 is activated, which applies a bias and erase signal to the magnetic head 5 during signal recording. The recording/reproducing switch 21 and the oscillator 22 have control inputs 23 and 24 respectively, via which they can be controlled by the control stage 12.

For the reproduction of speech signals the control stage 12 sets the switch 21 to its dashed position in FIG. 1. As a result of this, speech signals scanned from the magnetic tape 2 by the magnetic head 5 are applied to a read-amplifier circuit 25, whose output signals are fed to a loudspeaker 26 for acoustic reproduction. Instead of to the loudspeaker the output signals of the read amplifier circuit 25 can be applied to a head set via which the dictation can be monitored for transcription.

FIG. 1 shows diagrammatically that a first dictation signal 27 and a second dictation signal 28 are stored on the magnetic tape 2. In the case of such a dictation machine it is found to be very useful and practical if specific passages of the recorded dictation signals can be marked by marking signals when desired. In FIG. 1 such marking signals are indicated symbolically and bear the references M1, M2 and M3. As will become apparent from the following description the present apparatus enables marking signals of three different types to be recorded on the magnetic tape 2 and to be subsequently detected.

For this purpose the apparatus 1 comprises a system 29 for recording and detecting mutually distinguishable marking signals M1, M2 and M3 which can be recorded and stored on and be scanned from the magnetic tape. For starting the generation and recording of a marking signal M1 of the first type the apparatus 1 comprises a key A. For starting the generation and recording of a marking signal M2 of the second type the apparatus 1 comprises a key B. The generation and recording of a marking signal M3 of the third type, as will be described in detail hereinafter, can be started by actuating the key A twice in succession within a predetermined time interval. In this way it is achieved that no separate key is needed for starting the generation and recording of the marking signals of the third type. In order to start the detection of marking signals M1 of the first type a key C is provided, to start the detection of marking signals M2 of the second type a key D is provided, and to start the detection of marking signals M3 of the third type a key E is provided. The keyboard 16 comprises further keys which serve, for example, for starting the "recording" mode, the "reproduction" mode, the "fast forward" mode and the "fast reverse" mode and the like.

The system 29 for recording and detecting marking signals comprises a recording device 30, indicated diagrammatically in FIG. 1 by a dashed frame, for recording the marking signals to be stored, and a detection device 31, also indicated by a dashed frame in FIG. 1, for the detection of the marking signals being scanned. The recording device 30 comprises a generator device 32 for the generation of the marking signals to be stored. The detection device 31 comprises a detector means 33 for the detection of the marking signals being scanned.

The generator device 32 comprises a first generator stage 34 for generating a first signal for a first frequency, and a second generator stage 36 for generating a second signal of a second frequency. The frequency of the first signal is 40 Hz and the frequency of the second signal is 1500 Hz. In the present case the two generator stages 34 and 35 are realised by means of the microprocessor 14, and they supply pulse-shaped signals. The pulse-shaped signals supplied by the generator stages 34 and 35 are each applied to a filter stage 36 and 37, respectively, in the form of a low-pass filter, which filters convert the pulse-shaped signals into sinewave recording signals S1 and S2, which are applied to the summing stage 20, via which the signals S1 and S2 are applied to the switch 21 and the magnetic head 5. The generator device 32 further comprises a first time-control stage Z1 and a second time-control stage Z2. The first time-control stage Z1 enables the length of time during which the first recording signal S1 occurs to be defined. The second time-control stage Z2 enables the length of time during which the second recording signal S2 occurs to be defined. The two time-control stages Z1 and Z2 are also realised by means of tee microprocessor 14 and are constituted by time-window stages, as will become apparent from the following description of the flow chart in FIG. 2.

The detector means 33 comprises two filter stages 38 and 39, to which the signals detected during scanning by means of the magnetic head 5 are applied via the switch 21. It is to be noted that the detection of the marking signal is effected at a speed of transport of the magnetic tape 2 which is a factor of 20 higher than that during recording of the marking signals. During scanning of the marking signals this results in frequency conversion of the stored signals S1 and S2, so that signals S1' and S2' corresponding to the signals S1 and S2 having a frequency of 800 Hz and a frequency of 30 kHz are scanned. The signal S1' having a frequency of 800 Hz and corresponding to the first signal S1 can be extracted from the mixed signal applied to the filter stage 38 by means of this stage. By means of the second filter stage 39 the signal S2' having a frequency of 30 kHz and corresponding to the second signal S2 can be extracted from the mixed signal applied to this stage. The detector means 33 further comprises a detector stage 40 following the filter stage 38 to detect the signal S1' corresponding to the first signal, and a detector stage 41 following the filter stage 31 to detect the signal S2' corresponding to the second signal S2. The two detector stages 40 and 41 comprise, for example, rectifier stages on whose outputs a predetermined output signal D1 and D2, respectively, is produced when the relevant corresponding signals S1' and S2' occur. The detector means 33 further comprises a time-measurement stage Z3 following the detector stage 40 and a time-measurement stage Z4 following the detector stage 41. The durations during which the signals S1' and S2', corresponding to the first signal S1 and the second signal S2, appear can be measured by means of the two time-measurement stages Z3 and Z4 respectively, and in the present apparatus this is one twentieth of the length of the first signal S1 and the second signal S2 respectively. The two time-measurement stages Z3 and Z4 are also formed by means of the microprocessor 14 and comprise time-counting stages, as will become apparent from the following description with reference to the flow chart in FIG. 6. The two time-measurement stages Z3 and Z4 are followed by a logic stage 42, which is also realised by means of the microprocessor 14 and to which the time-measurement stages Z3 and Z4 supply measurement values C3 and C4, respectively, which differ depending on the measured lengths of the signals S1' and S2', respectively. The logic stage 42, depending on the measurement values C3 and C4 applied to it, generates detection signals H1, H2 and H3 which correspond to the marking signals M1, M2 and M3 scanned from the magnetic tape 2. The logic stage 42 comprises three outputs P1, P2 and P3 connected to a gate circuit 43, which has its output connected to the control input 13 of the tape-drive device 7 and, when a detection signal H1, H2 or H3 appears on one of the outputs P1, P2 and P3, respectively, supplies a control signal to the control input 13 to switch off the tape-drive device 7, so that the magnetic tape 2 is no longer driven.

Figure 2:
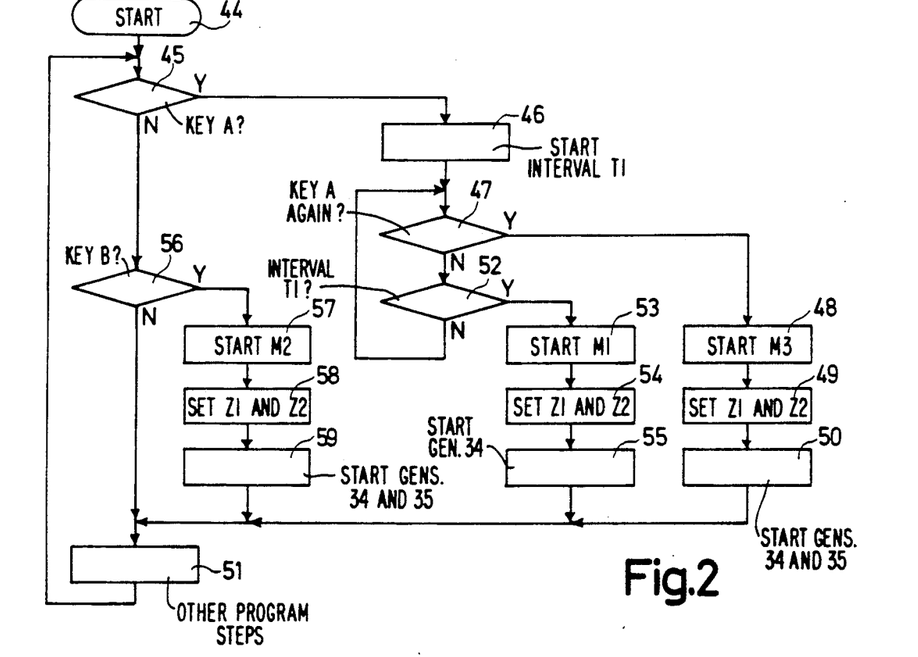
FIG. 2 is a flow chart of a program for generating said marking signals of three different types in the machine shown in FIG. 1.
Figure 5:
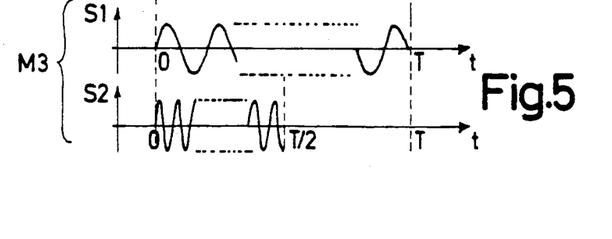
FIG. 5 shows the signal waveform of a marking signal of a third type generated in accordance with the program of FIG. 2.

A program sequence performed in the microprocessor 14 of the apparatus 1 in order to generate the marking signals M1, M2 and M3 of three different types by means of the system 29 for recording and detecting marking signals will now be described with reference to the flow chart in FIG. 2. This program sequence is started in the block 44. In the next block 45 it is ascertained whether the key A has been actuated. If this is the case, a time window for the time interval T1 of, for example, 500 ms is started in block 46. Subsequently, it is checked in block 47 whether the key A has been actuated a second time. If this is the case, the operator of the apparatus has given the command to generate a marking signal M3 of the third type and to record this signal on the magnetic tape. After this, in block 48 a "marking-signal recording" mode is started, in which the tape-drive device 7 drives the magnetic tape 2 in the direction indicated by the arrow 6 with the normal speed of transport, in which the recording/reproducing switch 21 is set to the switch position shown in solid lines in FIG. 1, and in which the oscillator 22 is started to generate a bias signal. Subsequently, in block 49, a time-window stage constituting the time-control stage Z1 for a time interval T of, for example, 650 ms is started and substantially at the same time a time-window stage constituting the time-control stage Z2 for the time interval T/2, i.e. 325 ms, is started. In block 50 this results in the generator stage 34 for generating the first signal S1 being activated by the time-window stage Z1 for the time interval T and substantially at the same starting instant the generator stage 35 for generating the second signal S2 being activated by the time-window stage Z2 for the time interval T/2. In the blocks 48, 49 and 50 pulse-shaped signals are generated, which are converted into sinewave signals S1 and S2 by the filter stages 36 and 37. In this way a marking signal M3 of the third type is generated, as is shown in FIG. 5. After the block 50 the program proceeds with block 51, which includes a number of further program steps. Upon completion of these program steps in block 51 the program of FIG. 2 returns to block 45.

Figure 3:
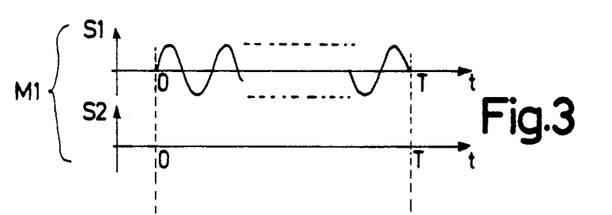
FIG. 3 shows the signal waveform of a marking signal of a first type, generated in accordance with the program given in FIG. 2.

When it is found in block 47 that they key A has not been actuated two times it is ascertained in block 52 whether the time interval T1 of the time window started in block 46 has elapsed. The time interval T1 of the time window defines the time within which the key A is to be actuated twice in order to produce the command for generating and recording a marking signal M3 of the third type. If the time interval T1 has not expired the program returns to block 47. However, if the time interval T1 has elapsed, which means that the key A has been actuated only once by the operator of the apparatus to give the command for generating a marking signal M1 of the first type, the "marking-signal recording" mode is started in block 53 in a way similar to that in block 48. Subsequently, in block 54, the time-window stage constituting the time-control stage Z1 is activated for the time interval T of 650 ms and substantially at the same time the time-window stage constituting the time-control stage Z2 is set to zero. After this, in block 55, this causes the generator stage 34 to be activated by the time-window stage Z1 for the time interval T, whereas the generator stage 35 is not activated by the time window stage Z2. A marking signal M1 of the first type as is illustrated in FIG. 3 is now generated in blocks 53, 54 and 55. After the block 55, the program proceeds with block 51.

Figure 4:
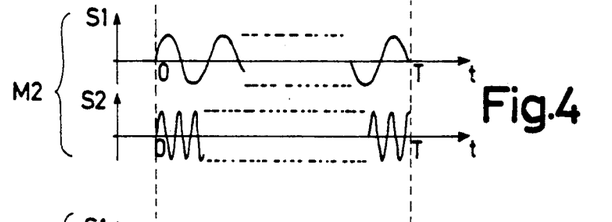
FIG. 4 shows the signal waveform of a marking signal of a second type, generated in accordance with the program of FIG. 2.

If it is found in block 45 that the key A has not been actuated, it is subsequently checked in block 56 whether the key B has been actuated. If this is not the case, the program proceeds with block 51. However, if said key has been actuated, i.e. if the operator of the apparatus has given the command to generate the marking signal M2 of the second type, the "marking-signal recording" mode is started in block 57 in analogy to the blocks 48 and 53. Subsequently, in block 58, the time-window stage constituting the time-control stage Z1 for the time interval T of 650 ms is activated and substantially at the same time the time-window stage constituting the time-control stage Z2 for the time interval T is activated. In block 59 this results in the two generator stages 34 and 35 being activated substantially at the same time by the two time-window stages Z1 and Z2 for the time interval T. A marking signal M2 of the second type as is illustrated in FIG. 4 is now generated in blocks 57, 58 and 59. After the block 59 the program proceeds with block 51.

Figure 6:
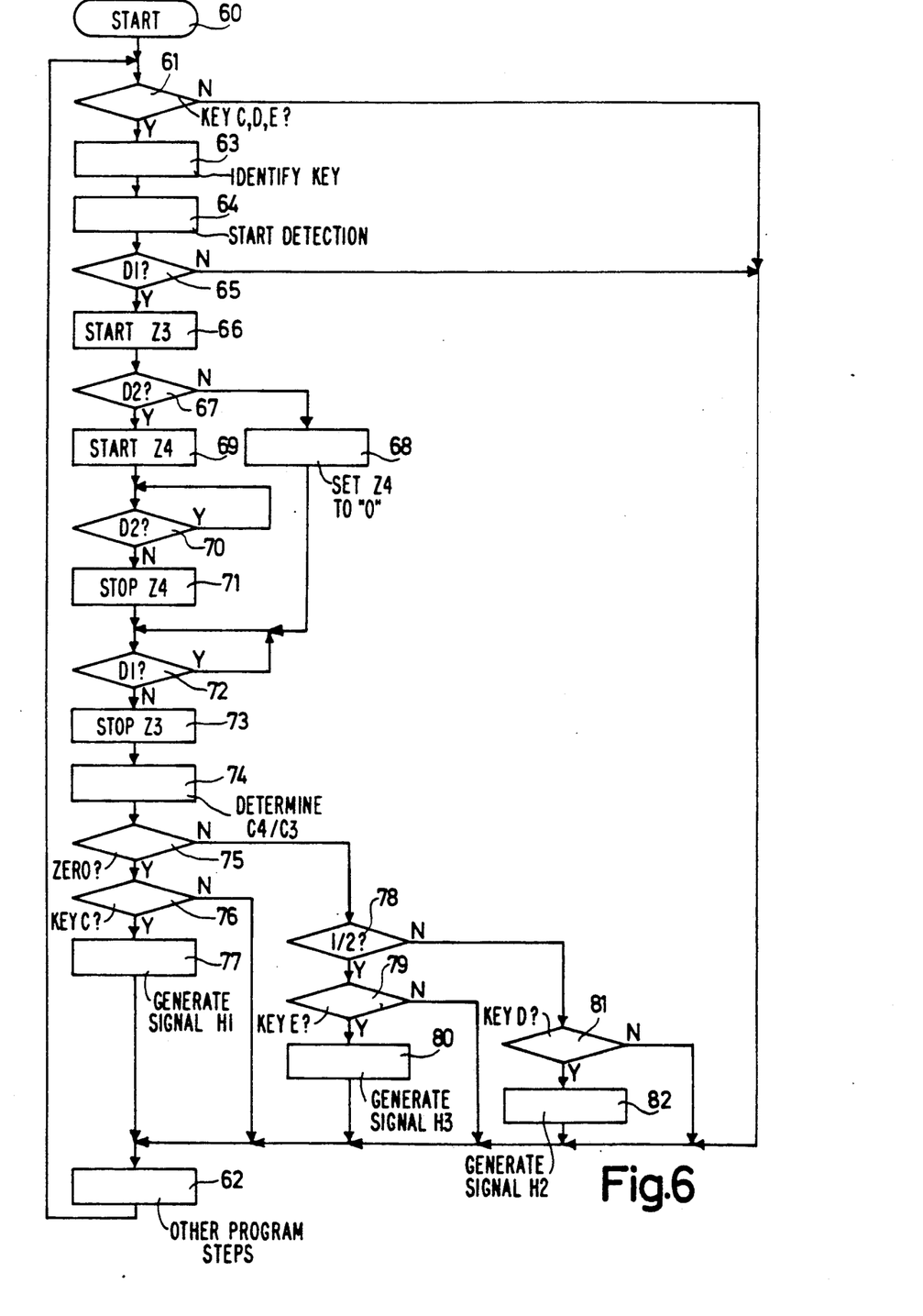
FIG. 6 is a flow chart of a program for the detection of marking signals of three different types as shown in FIGS. 3, 4 and 5.

Hereinafter a program sequence performed in the microprocessor 14 of the apparatus 1 will be described with reference to the flow chart in FIG. 6, which program sequence serves to detect the marking signals M1, M2 and M3 of three different types generated as described above. This program sequence is started in block 60. Subsequently it is ascertained in block 61 whether one of the three keys C, D and E has been actuated. If this is not the case, the program proceeds with block 62, which represents a plurality of other program steps. After completion of these program steps in block 62 the present program again proceeds with block 61.

If it is found in block 61 that one of the three keys C, D and E has been actuated, an identification signal is stored in block 63, in order to indicate which of these three keys C, D and E has been actuated. After this the "marking-signal detection" mode is started in block 64, the tape-drive device 7 first driving the magnetic tape 2 at twice the normal speed of transport in a direction opposite to that indicated by the arrow 6 until the beginning of the magnetic tape 2 is situated opposite the magnetic head 5, after which the tape-drive device 7 drives the magnetic tape 2 at twice the normal speed of transport in the direction indicated by the arrow 6 and the recording/reproducing switch 21 is set to the switch-position shown in broken lines in FIG. 1. Subsequently, it is checked in block 65 whether an output signal D1 appears on the output of the detector stage 40. If said output signal is available, which means that a signal S1' is scanned from the magnetic tape 2, a time-counting stage constituting the time-measurement stage Z3 is started in block 66. In block 67 it is subsequently ascertained whether an output signal D2 appears on the output of the detector stage 41. If this is not the case, i.e. if no signal S2' is scanned from the magnetic tape, a time-counting stage constituting the time-measurement stage E4 is set to zero in block 68, the count zero then being stored in the time-measurement stage Z4 as a measurement value C4. However, if in block 67 an output signal D2 is detected, which means that a signal S2' is scanned from the magnetic tape 2, the time counting stage constituting the time-measurement stage E4 is started in block 69. Subsequently, it is ascertained in block 70 whether the output signal D2 of the detector stage 41 is still available. If this is the case the program continues with block 70 as long as the output signal D2 is available. When it is ascertained in block 70 that the output signal D2 of the detector stage 41 is no longer available, the time-counting stage constituting the time-measurement stage Z4 is stopped in block 71, the count then reached being stored in the time-measurement stage Z4 as a measurement value C4. After block 71, in the same way as after block 68, the program sequence proceeds with block 72, in which it is checked whether the output signal d1 of the detector stage 40 is still available. If this is the case, the program sequence continues with block 72 as long as the output signal D1 is available. If it is found in block 72 that the output signal D1 of the detector stage 40 is no longer available, the time-counting stage constituted by the time-measurement stage Z3 is stopped in block 73, the count then reached being stored in the time-measurement stage Z3 as a measurement value C3.

After this the quotient of the counts C4 and C3 of the time-counting stages Z4 and Z3 is generated in block 74. Subsequently, it is ascertained in block 75 whether this quotient is zero. If it is zero, which means that a marking signal M1 of the first type has been scanned, it is checked in block 76 whether the key C has been actuated, which key is to be actuated to detect and process a marking signal M1 of the first type. The test in block 76 is carried out by checking the identification signal stored in block 63. If it is found in block 76 that key C has not been actuated, the program proceeds with block 62. However, if it is found in block 76 that the key C has been actuated the logic stage 42 will produce a detection signal H1 on its output P1 in block 77. This detection signal H1 indicates that, as desired, a marking signal M1 of the first type has been detected. This detection signal H1 is applied to the control input 13 of the tape-drive device 7 via the gate circuit 43, to switch off the drive when such a marking signal is detected. Obviously, the detection signal H1 can also be utilised in another manner, for example in that it is applied to an optical display device to indicate the presence of a marking signal of the first type. After the block 77 the program sequence proceeds with block 62.

When it is found in block 75 that the quotient of the counts C4 and C3 formed in block 74 is not zero, it is subsequently ascertained in block 78 whether the quotient formed in block 74 has the value ½. If this is the case, which means that a marking signal M3 of the third type has been scanned, it is checked in block 79 whether the key E has been actuated, which key is to be actuated in order to detect and process a marking signal M3 of the third type. If it is not the case, i.e. if the key E has not been actuated, the program sequence proceeds with block 62. However, if the key E has been actuated, the logic stage 42 will produce a detection signal H3 on its output P3 in block 80. This detection signal H3 indicates that, as desired, a marking signal M3 of the third type has been detected. After block 80 the program sequence proceeds with block 62.

If it is found in block 78 that the quotient of the counts C4 and C3 generated in block 74 is not ½, this means that in the present case the quotient will have the value 1, i.e. a marking signal M2 of the second type must be available, so that it is not necessary to check separately whether the quotient has the value 1. Therefore, the program sequence proceeds with block 81 without this test. In block 81 it is checked whether the key D has been actuated, which key is to be actuated in order to detect and process a marking signal M2 of the second type. If it is found in block 81 that the key D has been actuated, the logic stage 42 will produce a detection signal H2 on its output P2 in the block 82. This detection signal H2 indicates that, as desired, a marking signal M2 of the second type has been detected. After block 82 the program sequence proceeds with block 62. If it is found in block 81 that the key D has not been actuated, it must be assumed that the for marking-signals detection process has been started erroneously, in which case the generation of a detection signal by the logic stage 42 is inhibited and the program sequence consequently proceeds with block 62.

As will be apparent from the above description the system in accordance with the invention very simply enables marking signals of three different types to be recorded on the magnetic tape and to be processed after they have been scanned from the magnetic tape. FIGS. 3, 4 and 5 show that the marking signal M1 of the first type only consists of the signal S1 which has a frequency of 40 Hz and a length T. The marking signal M2 of the second type and the marking signal M3 of the third type each comprise the first signal S1, which has a frequency of 40 Hz, and the second signal S2, which has a frequency of 1500 Hz, the first signal S1 having a length T both in the making signals M1 and M2. The difference between the marking signal M2 of the second type and the marking signal M3 of the third type resides in the fact that the length of the second signal S2 in the marking signal M3 of the third type is only T/2, whereas in the marking signal M2 of the second type it is T. In this way it is achieved that the marking signals of the second and the third type can be distinguished from one another unambiguously and correctly. However, since the marking signals of the second type and of the third type are both made up of the same signals S1 and S2, it is achieved that marking signals of these two types can also be detected by means of a detection device which need not comprise time-measurement stages for measuring the lengths of the signals S1' and S2' corresponding to the signals S1 and S2, but which comprises only stages for detecting the mere presence of the corresponding signals S1' and S2'. Such a detection device does not enable marking signals of the second type and marking signals of the third type to be distinguished from one another, but it does enable the presence of such marking signals to be detected. Since only the quotient, i.e. the ratio between the measurement values of the time-measurement stages, is used for the detection of the marking signals, the advantage is obtained that detection is independent of the speed of transport of the magnetic tape during scanning of the marking signals.

Marking signals of the three types described in the foregoing are recorded on the magnetic tape by a dictator in order to mark dictations or dictated passages. Marking signals of the first type may mark, for example, the end of a dictation on a magnetic tape if no specific instructions, wishes or requirements for its transcription have been given. Such a marking signal of the first type is recorded on the magnetic tape when the end of such a dictation stored on the magnetic tape is situated opposite the recording/reproducing head. Marking signals of the second type mark, for example, a part of a dictation stored on the magnetic tape for which the dictator wishes to give or has given an auxiliary instruction such as an insert, a correction or other message which relates to or which does not relate to the dictation, which message may also be stored on the magnetic tape or, alternatively, on a separate storage element, such as a further magnetic tape or a note. Marking signals of the third type mark, for example, the end or the beginning of a direction on the magnetic tape to be handled with special care or priority during transcription; such dictations are referred as priority dictations.

It is obvious that by means of a system in accordance with the invention for recording and detecting marking signals as described above a further marking signal of the third type or several of such further marking signals of the third type can be stored on the magnetic tape. For example, such a further marking signal of the third type may be made up of the first signal S1 having a frequency of 40 Hz and a length T and the second signal S2 having a frequency of 1500 Hz and a length T/4. Such a further marking signal of the third type may be used, for example, for marking the end of a group of related dictations stored on the magnetic tape, which group of dictations has been dictated, for example, by a single person, or which group of dictations relates to the same subject. Such a group of related dictations can also be obtained, for example, in that the dictations have been transmitted to a dictation machine which can be connected to the telephone network via the telephone network during a single uninterrupted call, the recording of such a further marking signal of the third type in this dictation machine being started automatically when the transmission of these dictations and the call have ended.

Figure 7:
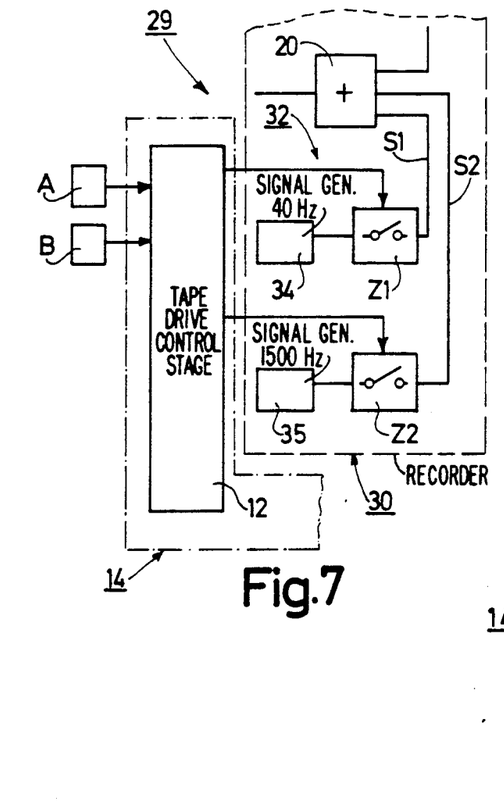
FIG. 7, shows a part of a second embodiment of a recording device in accordance with the invention for recording marking signals, which is a modification of the embodiment shown in FIG. 1.

Another embodiment of a system 29 for recording marking signals in accordance with the invention is shown partly in FIG. 7. Therein the generator stages 34 and 35 and the time-control stages Z1 and Z2 of the generator device 32 of the recording device 30 are constructed by means of discrete components without the use of the microprocessor 14, in contradistinction to the system shown in FIG. 1. The two generator stages 34 and 35 are constructed as sinewave generators, which continually supply the first signal S1 and the second signal S2. In the present case the two time-control stages Z1 and Z2 are constructed as gate circuits which can be controlled by the control stage 12 and which each time transfer the signals S1 and S2 supplied by the generator stages 34 and 35 for a length of time defined by the control stage 12. The signals S1 and S2 transferred by the time-control stages Z1 and Z2 are applied directly to the summing stage 20, from which the signals S1 and S2 are fed to the magnetic recording/reproducing head to be recorded on the magnetic tape. In the present case it is not necessary to provide filter stages for the signals S1 and S2, before these signals are applied to the summing stage 20.

Figure 8:
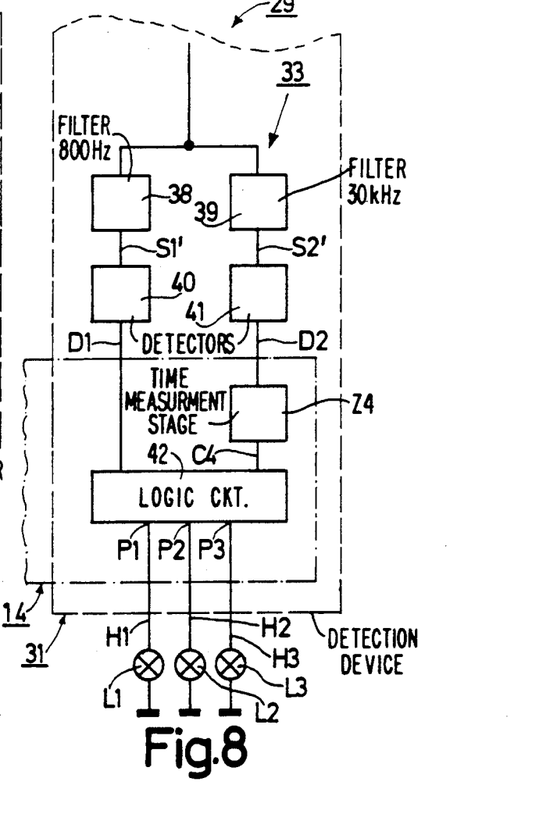
FIG. 8 shows a part of a second embodiment of a detection device in accordance with the invention for detecting marking signals, which is a modification of the embodiment shown in FIG. 1.

In a second embodiment of a system 33 for detecting marking signals in accordance with the invention, which is shown only partly in FIG. 8, the detector means 31 of the detection device 33 is of a construction which differs from that of the detector shown in FIG. 1. In said detector 31 the detector stage 40, by means of which the signal S1' corresponding to the recorded signal S1 can be detected, is not followed by a time-measurement stage. In said detector 31 the output signal D1 of the detector stage 40 is applied directly to the logic stage 42. Thus, in this detector stage 31 only the presence of the signal S1' corresponding to the recorded signal S1 is detected and not the length of this signal S1', which is possible since the length of the signal S1 and consequently that of the corresponding signal S1' is equal in all the marking signals of the three different types. During the detection of the marking signals only the presence of the corresponding signal S1' is detected, and in order to distinguish the different types of marking signals, the length of the signal S2' corresponding to the signal S2 is measured and in the logic stage 42 the measurement value C4 thus determined together with the output signal D1 of the detector stage 40 are processed. In this system 33 the detection signals H1, H2 and H3 are not applied to a gate circuit as in FIG. 1, but they are each applied to indicator lights L1, L2 and L3 respectively, to cause them to turn on briefly to indicate the presence of a mark of the first, or the second or the third type respectively.

Figure 9:
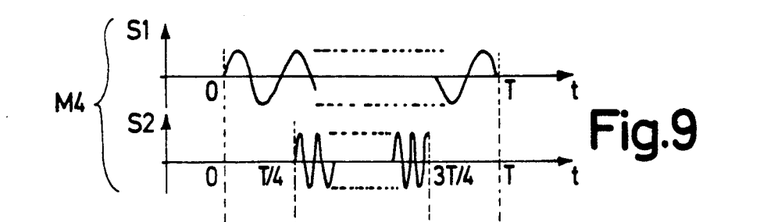
FIG. 9 shows a further marking signal of the third type, which can be generated by means of a recording device in accordance with the invention for recording marking signals.

FIG. 9 shows an example of a further marking signal M4 of the third type. This marking signal M4 is made up of the first signal S1 of a frequency of 40 Hz, for which a length T has been selected and of the second signal S2 of a frequency of 1500 Hz, for which a length T/2 has been selected, the instant at which the second signal S2 occurs being shifted by a time interval T/4 relative to the instant at which the first signal S1 appears. Such a marking signal can be processed advantageously because during its detection the instant at which the time-measurement stage for measuring the length of the signal S2' corresponding to the second signal is started is non-critical relative to the start of the time-measurement stage for measuring the length of the signal S1' corresponding to the first signal S1.

Figure 10:
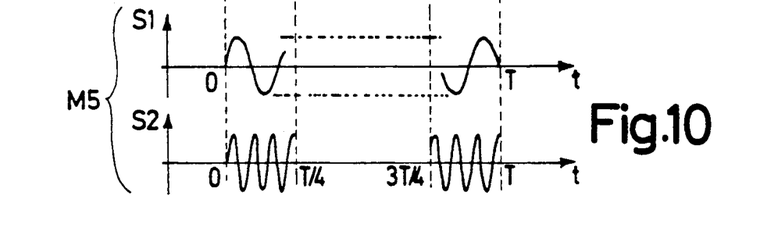
FIG. 10 shows yet another marking signal of the third type, which can be generated by means of a recording device in accordance with the invention for recording marking signals.

In the case of the further marking signal M5 of the third type shown in FIG. 10 the first signal S1 again has a length T and the second signal S2 has a length T/2 but is now formed by two parts each having a length of T/4, spaced from one another by an interval of T/2. This marking signal has the advantage that despite the different lengths of the two signals S1 and S2 the two signals S1 and S2 have the same starting point and the same end point, so that during processing of these signals the time-measurement stages for measuring the lengths of the signals S1' and S2' corresponding to the signals S1 and S2 can be started and stopped at the same time.

As will be apparent from the foregoing, there are several embodiments of a system for recording and processing marking signals in accordance with the invention. For example, the recording device for marking signals in such a system may be incorporated in a separate recording apparatus which is construed only to record dictations and its detection device may be incorporated in a separate reproducing apparatus, which is construed only for transcription. Such a system for recording and reproducing marking signals can be employed not only in a dictation system for recording and reproducing dictations, but also in other systems for recording and reproducing other information signals. The marking signals can be recorded in the "recording" mode of an apparatus, in the "reproducing" mode of the apparatus, or also in the "stop" mode of the apparatus. The marking signals need not be recorded together with the information signals in the same track of a record carrier, but may be recorded in a separate track. Moreover, the marking signals of the third type may have further signal compositions. For example, such a further marking signal of the third type may be composed of the first signal S1 having a length T and the second signal S2 having a length 2T. Alternatively, such a further marking signal of the third type may be made up of the first signal S1 having a length T/3 and the second signal S2 having a length T. In the case of the last-mentioned marking signal of the third type the first signal S1 consequently has a length which differs from the value T.

I claim:

1. Apparatus for recording one or more of a plurality of different marking signals at different positions along a record carrier track during scanning of such track, comprising:

means for generating first and second recording signals (S1, S2) respectively at a first frequency and a different second frequency;

first and second time-control stages coupled to said signal generating means for respectively selecting a predetermined duration T of said first recording signal (S1) and a duration of said second recording signal (S2) selected from among the durations T, zero, and a value between T and zero, such selection being in accordance with the particular marking signal to be recorded; the first and second recording signals of such selected durations being respectively produced at outputs of said first and second time-control stages, respectively;

keyboard actuated control means coupled to said first and second time-control stages for controlling the recording signal durations selected thereby in accordance with the particular marking signal to be recorded, as identified on a keyboard by a user of the apparatus; and means coupled to the outputs of said first and second time-control stages for combining the first and second recording signals having said selected durations as produced at such outputs, said combination of said recording signals constituting the marking signal to be recorded.

2. Recording apparatus as claimed in claim 1, for recording three different marking signals (M1, M2, M3) respectively at different positions on said record carrier track; the first marking signal (M1) being said first recording signal (S1) of said duration T; the second marking signal (M2) being the combination of said first recording signal (S1) of said duration T and said second recording signal (S2) also of said duration T; and the third marking signal (M3) being the combination of said first marking signal (S1) of said duration T and said marking signal (S2) of a duration between T and zero; said keyboard actuated control means being adapted to cause said second time-control stage to: (i) select a duration of zero for said second marking signal (S2) when said keyboard identifies the marking signal to be recorded as said first marking signal (M1), (ii) select a duration of T for said second marking signal (S2) when said keyboard identifies the marking signal to be recorded as said second marking signal (M2), and (iii) select a duration between T and zero for said second marking signal when said keyboard identifies the marking signal to be recorded as said third marking signal (M3).

3. Recording apparatus as claimed in claim 2, wherein for generating said third marking signal (M3) the two time-control stages define the same starting instant for both the first and second recording signals (S1, S2).

4. Recording apparatus as claimed in any of claims 1, 2 or 3, wherein said signal generating means comprises first and second signal generators for respectively generating the first and second recording signals (S1, S2), and the two time-control stages activate the two signal generators to generate the first and second recording signals (S1, S2).

5. Recording apparatus as claimed in either of claims 2 or 3, wherein said keyboard comprises a first key element for initiating generation and recording of the first marking signal (M1) and a second key element for initiating generation and recording of the second marking signal (M2); the third marking signal (M3) being initiated by actuation of one of said first and second key elements at least twice in succession within a predetermined time interval.

6. Apparatus for reading from a record carrier track a plurality of different marking signals which have been recorded at different positions thereon by recording apparatus as claimed in claim 8, each of said marking signals being recorded as a combination of a first recording signal (S1) of a first frequency and having a duration T and a second marking signal (S2) of a second frequency and having a duration which is one of T, zero or a value between T and zero, the particular one of such durations being in accordance with a particular one of the recorded marking signals; said apparatus comprising:

means for scanning said track to read-out therefrom the recording signals thereon;

a first detector stage coupled to said scanning means for deriving from the read-out recording signals a first detection signal (S1') corresponding to said first recording signal (S1) and having a corresponding duration;

a second detector stage coupled to said scanning means for driving from the read-out recording signals a second detection signal (S2') corresponding to said second recording signal (S2) and having a corresponding duration, said second detector stage including a first time-measurement stage for measuring the duration of said read-out recording signal (S2'); and a logic circuit coupled to said first and second detector stages and responsive to the detection signals (S1', S2') produced thereby and the relative durations thereof to generate a marking signal corresponding to a combination of recording signals having the same relative durations as said detection signals.

7. Read-out apparatus as claimed in claim 6, wherein said first detector stage includes a second time-measurement stage for measuring the duration of said first detection signal S1', the first and second time-measurement stages both supplying their duration measurement values to said logic stage; and said logic stage generates said marking signal in accordance with the ratio between the measured durations of said first and second detection signals (S1', S2).

* * * * *